(12) United States Patent
Vogt

(10) Patent No.: US 9,415,819 B2
(45) Date of Patent: Aug. 16, 2016

(54) RIG MOVEMENT AND ROTATION ASSEMBLY

(71) Applicant: Woolslayer Companies, Inc., Tulsa, OK (US)

(72) Inventor: Dewayne G. Vogt, Tulsa, OK (US)

(73) Assignee: Woolsayer Companies, Inc., Tulsa, OK (US)

( * ) Notice: Subject to any disclaimer, the term of this patent is extended or adjusted under 35 U.S.C. 154(b) by 0 days.

(21) Appl. No.: 14/549,239

(22) Filed: Nov. 20, 2014

(65) Prior Publication Data

US 2016/0144908 A1    May 26, 2016

(51) Int. Cl.
*B62D 57/032*    (2006.01)

(52) U.S. Cl.
CPC .................................... *B62D 57/032* (2013.01)

(58) Field of Classification Search
CPC ....... B62D 57/02; B62D 57/00; B62D 57/024
USPC ............................... 180/8.1, 8.5, 8.6; 280/279
See application file for complete search history.

(56) References Cited

U.S. PATENT DOCUMENTS

| | | | | |
|---|---|---|---|---|
| 3,796,276 A * | 3/1974 | Maeda | ...................... | B65G 7/02 180/8.5 |
| 5,921,336 A * | 7/1999 | Reed | ...................... | B62D 57/00 180/8.1 |
| 7,172,203 B2 * | 2/2007 | Barnett | ......................... | 280/28.5 |
| 7,819,209 B1 * | 10/2010 | Bezner | ............................ | 180/8.1 |
| 8,490,724 B2 | 7/2013 | Smith et al. | | |
| 8,561,733 B2 * | 10/2013 | Smith et al. | ..................... | 180/8.1 |
| 9,004,203 B2 * | 4/2015 | Smith et al. | ..................... | 180/8.1 |
| 9,045,178 B2 * | 6/2015 | Smith et al. | | |
| 2013/0156538 A1 * | 6/2013 | Smith | ..................... | B62D 57/02 414/800 |
| 2013/0277124 A1 | 10/2013 | Smith et al. | | |
| 2014/0054097 A1 * | 2/2014 | Bryant | .................. | E21F 13/006 180/8.1 |
| 2015/0016887 A1 * | 1/2015 | Schmidt et al. | ................... | 405/3 |

* cited by examiner

*Primary Examiner* — Jacob Knutson
(74) *Attorney, Agent, or Firm* — Head, Johnson & Kachigian, P.C.

(57) ABSTRACT

A rig movement and rotation assembly, which includes a first pair of vertical lifting jacks and a second pair of vertical lifting jacks. Each of the vertical lifting jacks has an upper end connected to a rig substructure and a lower end. A roller assembly is connected to the lower end of each of the vertical lifting jacks with each roller assembly rotatable on an axis. A steering cam arm bracket extends from each roller assembly. A first connecting link joins the steering cam arm brackets from the first pair of lifting jacks together and a second connecting link joins the steering cam arm brackets from the second pair of lifting jacks together. An actuator extends or retracts the length of each of the connecting links. A skid jack for each of the vertical lifting jacks engages with the roller assembly.

6 Claims, 11 Drawing Sheets

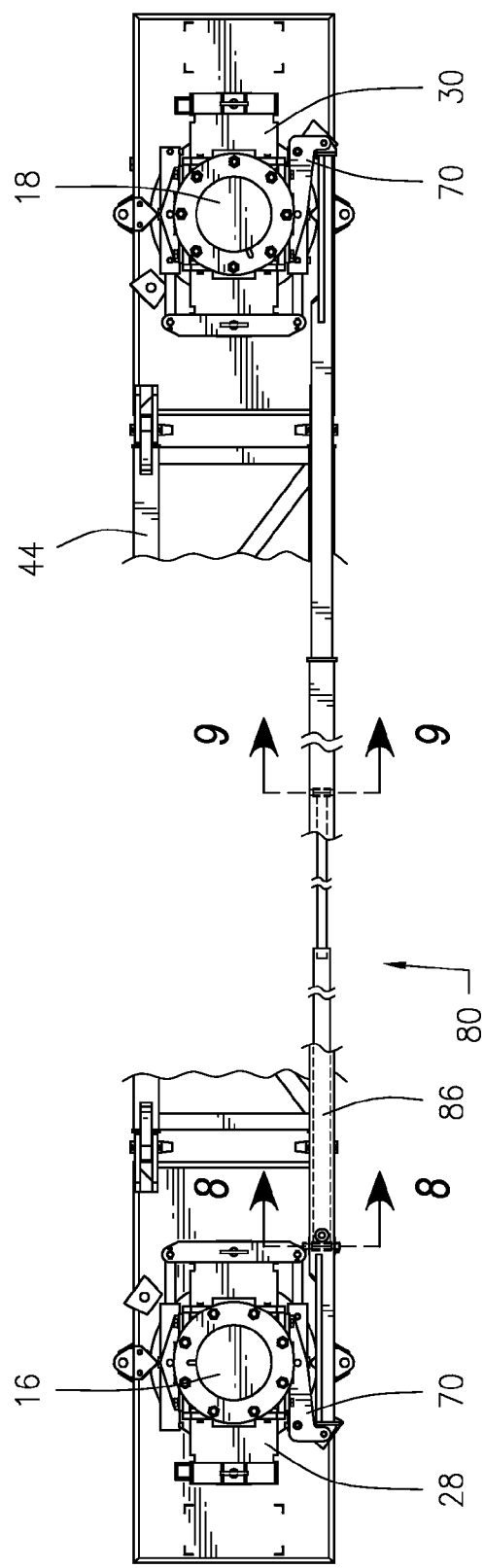
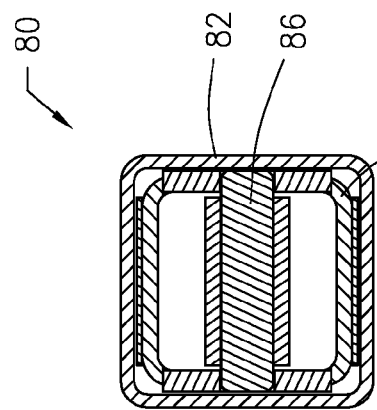
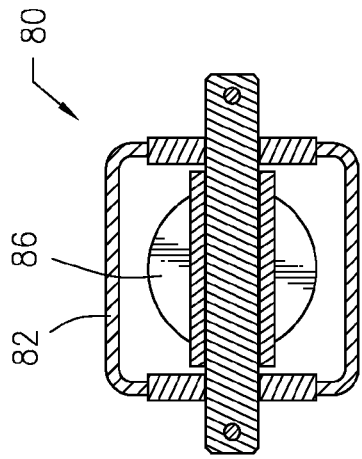
FIG. 7
FIG. 9
FIG. 8

RIG MOVEMENT AND ROTATION ASSEMBLY

BACKGROUND OF THE INVENTION

1. Field of the Invention

The present invention is directed to a rig movement and rotation assembly. In particular, the present invention is directed to a rig movement and rotation assembly for moving heavy equipment, such as a drilling rig, wherein the assembly will automatically steer or directionally position and move the heavy equipment without any manual intervention.

2. Prior Art

It is sometimes desirable to move a subterranean drilling rig from one location to a nearby location. For example, it is sometimes desirable to move the rig to a nearby location to utilize an alternate well bore. Traditionally, a drilling rig and all of its equipment is brought to a well site and assembled in a "rig up" procedure. After the drilling or other operation is completed, the entire drilling rig and all of its equipment is disassembled in a "rig down" procedure and then moved to a subsequent location.

A number of systems in the past have been utilized to move an entire drilling rig structure without disassembling. One type of system in the past included somewhat primitive rollers and skids that attempted to slide the drilling structure.

U.S. Pat. No. 5,921,336 on a Walking Substructure Device illustrates a system with four lifting jacks with jack pads which are each rotatable. The jack pads may be manually rotated and positioned when raised above ground level in a desired radial position. The equipment may then be incrementally displaced thereafter.

Other incremental movement systems are shown in U.S. Pat. No. 8,490,724; U.S. Pat. No. 8,561,733; and U.S. Patent Publication No. 2013/0277124. In U.S. Patent Publication No. 2013/0277124, an incremental movement system is disclosed with a fine tune mechanism to position the load.

Notwithstanding the foregoing, there remains a need to provide a system for incrementally moving heavy equipment in any direction wherein the steering or directional positioning is automatically accomplished without manual intervention.

SUMMARY OF THE INVENTION

The present invention is directed to a rig movement and rotation assembly. A first pair of vertical lifting jacks and a second pair of vertical lifting jacks are parallel to each other. Each of the vertical lifting jacks has an upper end connected to a rig substructure. Each of the lifting jacks moves between a retracted and an extended position.

A roller assembly is connected to each lower end of the vertical lifting jacks.

A skid pad engages each of the roller assemblies.

The lower end of each lifting jack is connected to the roller assembly at a roller housing. A roller housing contains a roller or a plurality of rollers therein so that the rollers engage a flat surface on a roller track which, in turn, is connected to and secured to a turntable.

A pair of parallel skidding cylinders incrementally moves the roller housing and rollers on the roller track.

The roller track includes a pair of opposed openings which align with openings in, to or through the skid pad. The openings in the skid pad are arranged in an annular pattern so that when the roller assembly is in a desired rotational position with respect to the skid pad, lock pins can be inserted in order to lock the roller assembly in place.

A steering cam arm bracket is fastened to and extends from the roller housing. A first connecting link joins the steering arm bracket from one roller assembly to the steering arm bracket from another roller assembly. The connecting link includes an outer tube with an actuator within the outer tube. The actuator is connected to an inner tube which is moveable within the outer tube. Accordingly, extension or retraction of the actuator extends or retracts the length of the connecting link. Extension or retraction of the connecting link will steer or automatically position a pair of the roller assemblies.

BRIEF DESCRIPTION OF THE DRAWINGS

FIG. 5 illustrates a perspective view of the vertical lifting jack, roller assembly and skid pad, while

FIG. 7 illustrates a top view of a first pair of lifting jacks with the accompanying roller assemblies and accompanying skid pads;

FIG. 8 illustrates a sectional view taken along section line 8-8 of FIG. 7, while FIG. 9 illustrates a sectional view taken along section line 9-9 of FIG. 7;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

Figure 1:
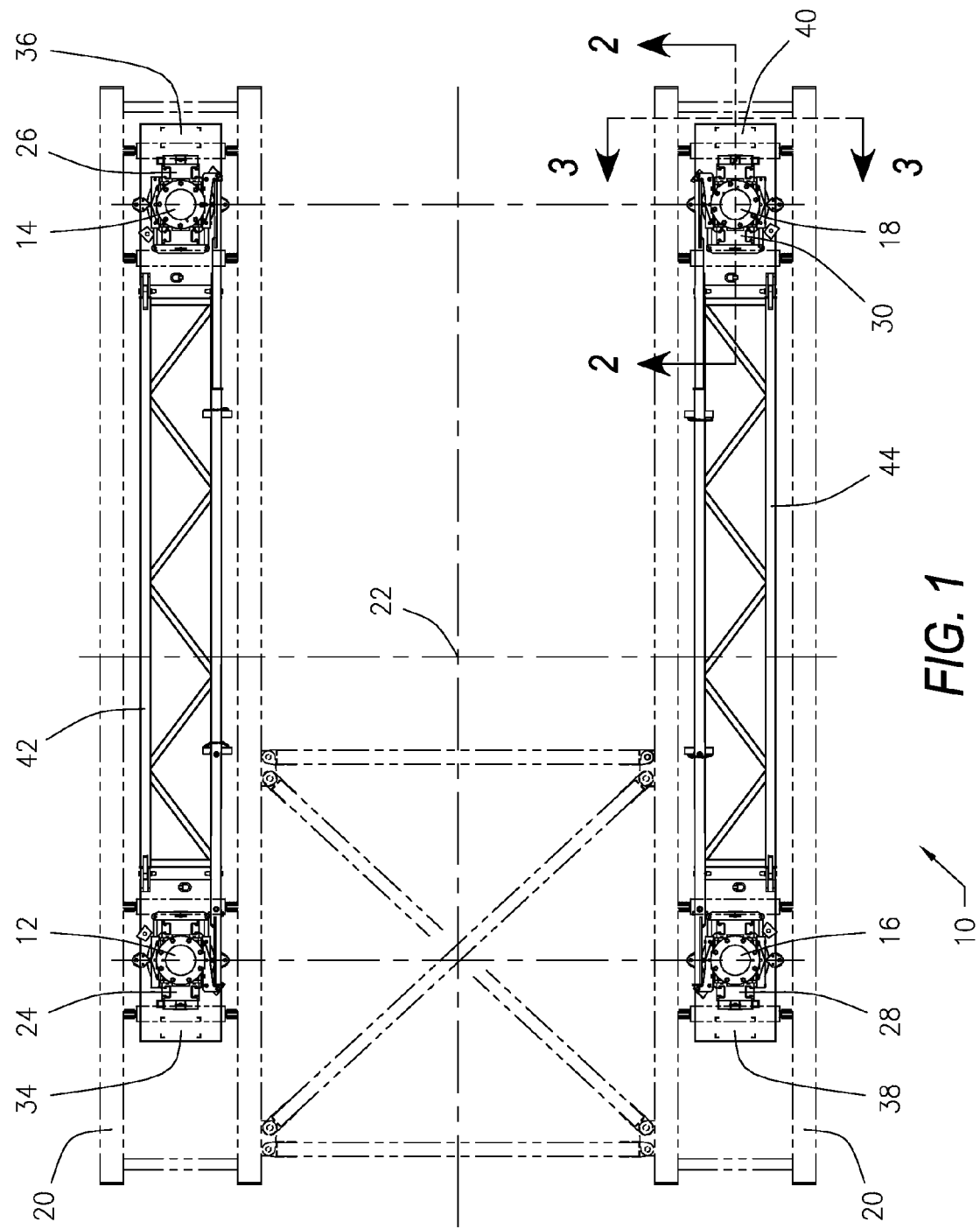
FIG. 1 illustrates a top view of a rig movement and rotation assembly constructed in accordance with the present invention.

Referring to the drawing in detail, FIG. 1 illustrates a top view of a rig movement and rotation assembly 10 constructed in accordance with the present invention. A first pair of vertical lifting jacks 12 and 14 are parallel to and spaced from each other. A second pair of vertical lifting jacks 16 and 18 are likewise parallel to and spaced from each other. The first pair of lifting jacks is also parallel to the second pair of lifting jacks.

Each of the vertical lifting jacks 12, 14, 16 and 18 has an upper end connected to a rig substructure 20. Portions of the rig substructure 20 are shown in dashed lines. Each of the lifting jacks includes a hydraulic cylinder in order to move between a retracted and an extended position. It will be appreciated that another type of actuator might alternately be employed.

The rig substructure 20 supports a drilling rig and is shown positioned over a well bore center line 22.

A roller assembly 24, 26, 28 and 30 (to be described in detail) is connected to each lower end of the vertical lifting jacks 12, 14, 16 and 18, respectively.

A skid pad 34, 36, 38 and 40 engages each of the roller assemblies 24, 26, 28 and 30, respectively.

A pad spreader assembly 42 extends between the skid pads 34 and 36 of the first pair of vertical lifting jacks 12 and 14. Likewise, a pad spreader assembly 44 extends between the skid pads 38 and 40 of the second pair of vertical lifting jacks 16 and 18. The pad spreader assemblies 42 and 44 may include lattice support frameworks.

Figure 2A:
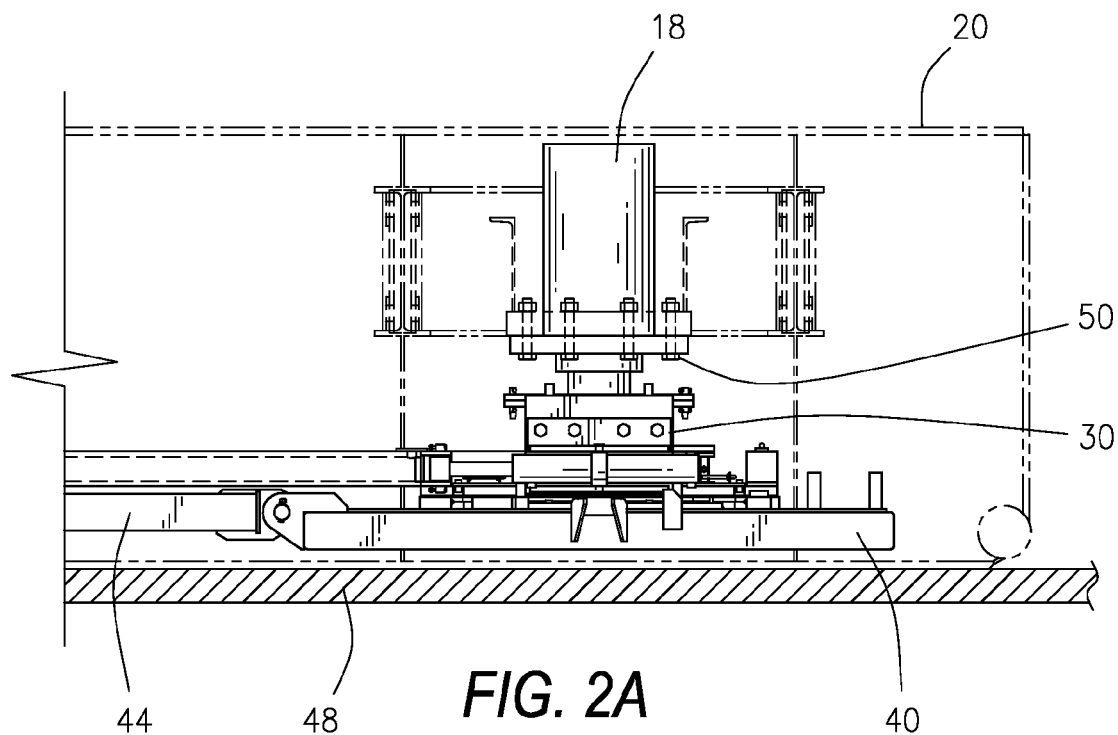
FIGS. 2a and 2b illustrate a sectional view taken along section line 2-2 of FIG. 1.
Figure 2B:
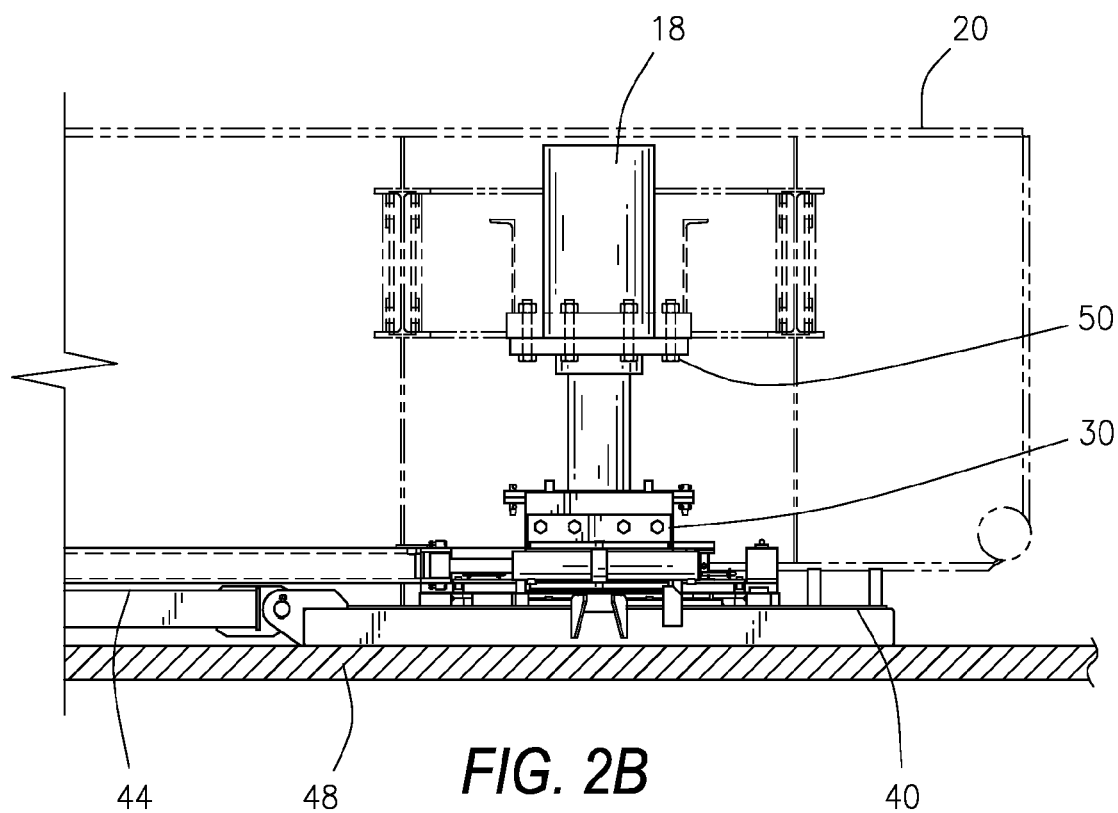

FIGS. 2A and 2B illustrate sectional views taken along section line 2-2 of FIG. 1. The vertical lifting jack 18 is connected to the substructure 20 (shown in dashed lines) by fasteners 50. The lower end of the lifting jack 18 is connected to the roller assembly 30, to be described in detail. The roller assembly 30 engages the skid pad 40.

As seen in FIG. 2A, the substructure 20 is supported by and rests on ground 48 or a bearing mat. The hydraulic cylinder of the lifting jack 18 is in the retracted or raised position so that the skid pad 40 is raised above ground level. An alternate position is seen in FIG. 2B. The skid pad 40 rests on ground 48 with the substructure 20 in a raised position so that the substructure is above ground level. The cylinder of the lifting jack 18 is in the extended position in FIG. 2B.

A portion of the pad spreader assembly 44 is visible in FIGS. 2A and 2B and is shown pinned or otherwise attached to the skid pad 40.

Figure 3A:
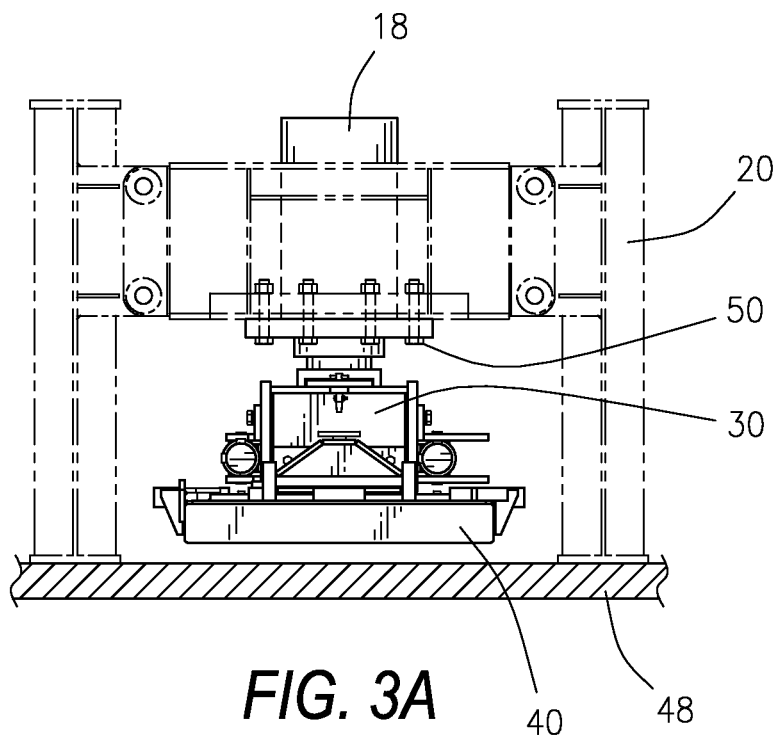
FIGS. 3a and 3b illustrate a sectional view taken along section line 3-3 of FIG. 1.
Figure 3B:
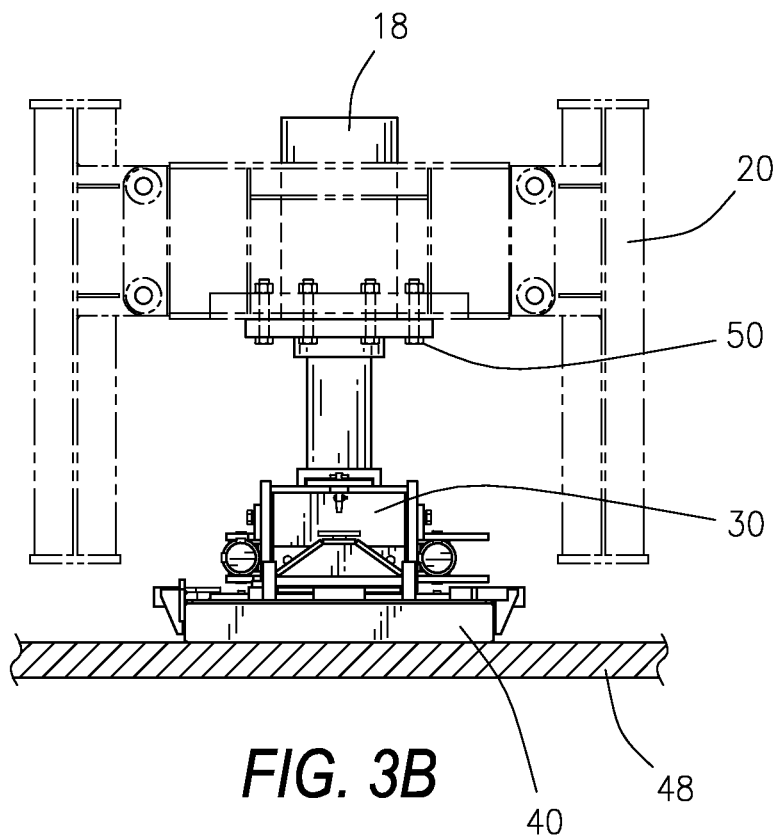

FIGS. 3A and 3B illustrate sectional views taken through section line 3-3 of FIG. 1. In FIG. 3A, the substructure 20 is shown supported by and resting on ground 48 with the cylinder of the lifting jack 18 in the raised or retracted position so that the skid pad is raised above ground level. In FIG. 3B, the substructure 20 is raised above ground level with the cylinder of the lifting jack 18 in an extended position. The skid pad 40 rests on ground 48.

Figure 4:
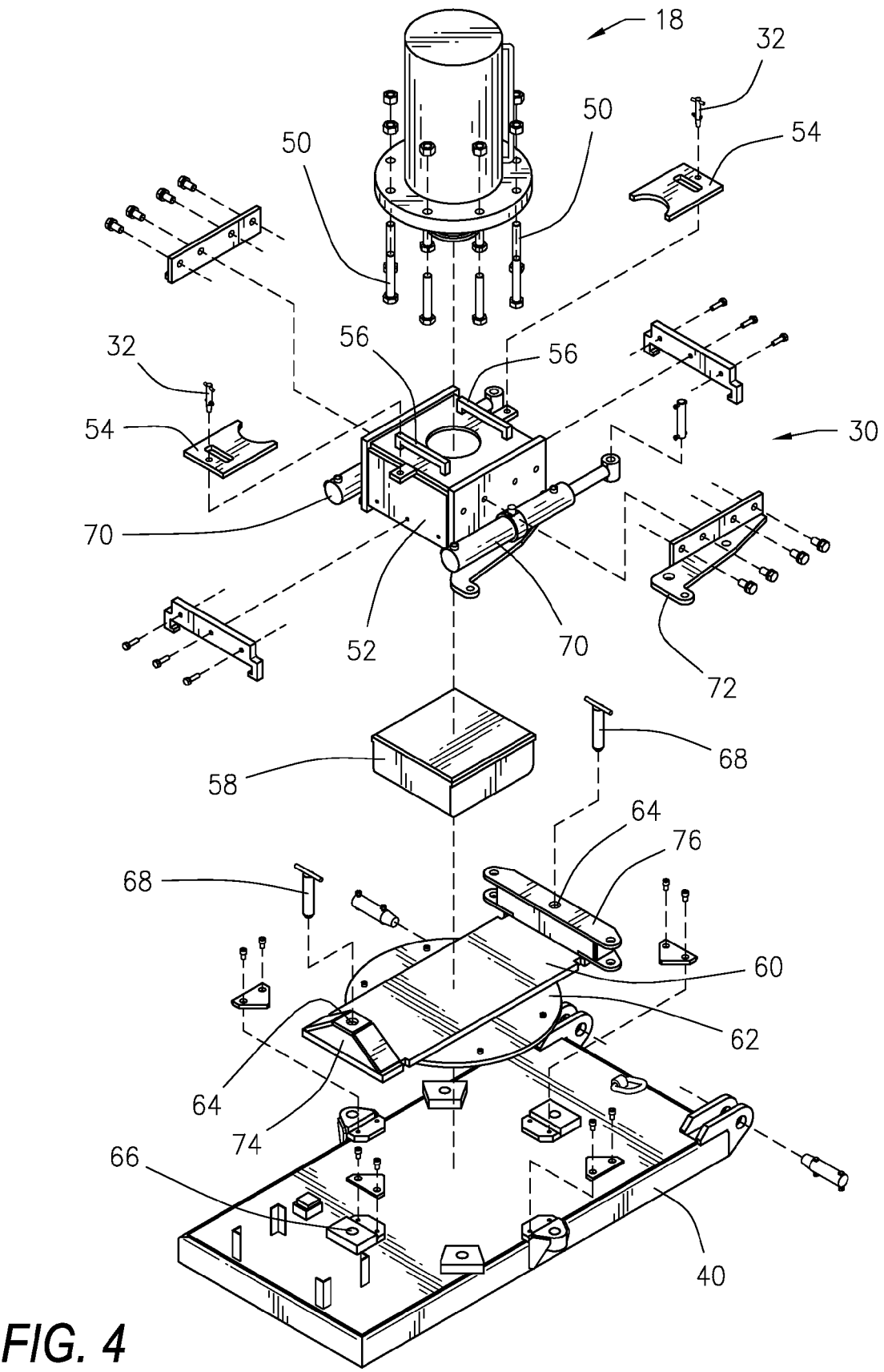
FIG. 4 illustrates an exploded view of a lifting jack, roller assembly and skid pad of the rig movement and rotation assembly.

FIG. 4 illustrates an exploded view of the lifting jack 18, the roller assembly 30 and the skid pad 40. Each of the lifting jacks, roller assemblies and skid pads will be configured in similar fashion. The vertical lifting jack 18 is moveable between a refracted and an extended position as previously described. Fasteners 50 will secure the lifting jack 18 to the substructure (not shown in FIG. 4).

The lower end of the lifting jack 18 is connected to the roller assembly 30 at a roller housing 52. A pair of cylinder retainers 54 pass through a pair of brackets 56 on the roller housing 52 and retain a ring groove at the base of the lifting jack 18. The retainers 54 are secured with pins 32 to the roller housing 52. Accordingly, the roller assembly 30 is raised or lowered by action of the cylinder.

The roller housing 52 contains a roller or a plurality of rollers 58 therein.

The rollers 58 engage a flat surface on a roller track 60 which, in turn, is connected to and secured to a turntable 62. The turntable 62 rests on and is rotatable on the skid pad 40. The range of movement on the roller track 60 is limited by opposed stops 74 and 76.

The roller track 60 includes a pair of opposed openings 64 in the stops 74 and 76, which will align with openings 66 into or through the skid pad 40. The openings 66 are arranged in guides in an annular pattern. When the roller assembly 30 is in the desired rotational position with respect to the skid pad 40, lock pins 68 can be inserted through the openings 64 to lock the roller assembly to the skid pad.

Figure 5:
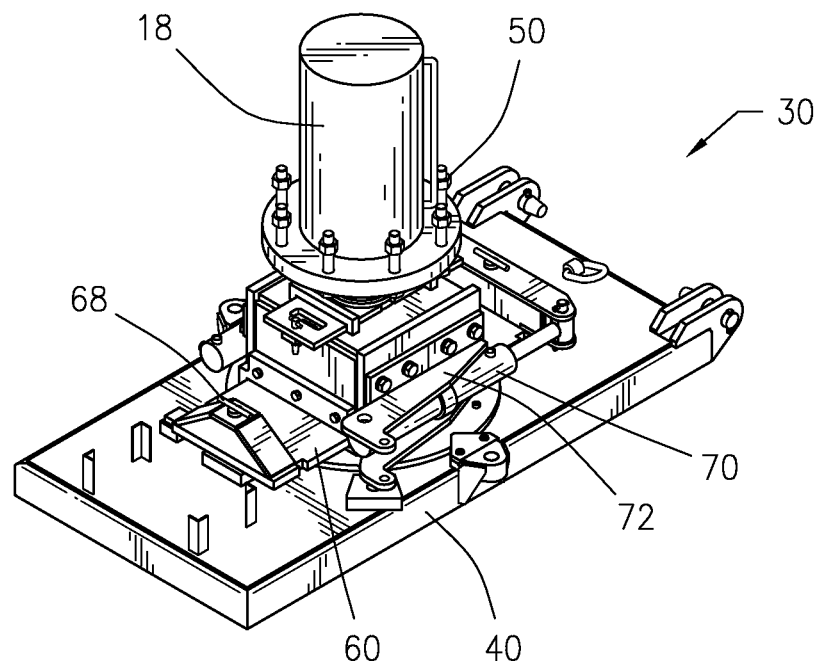
Figure 6:
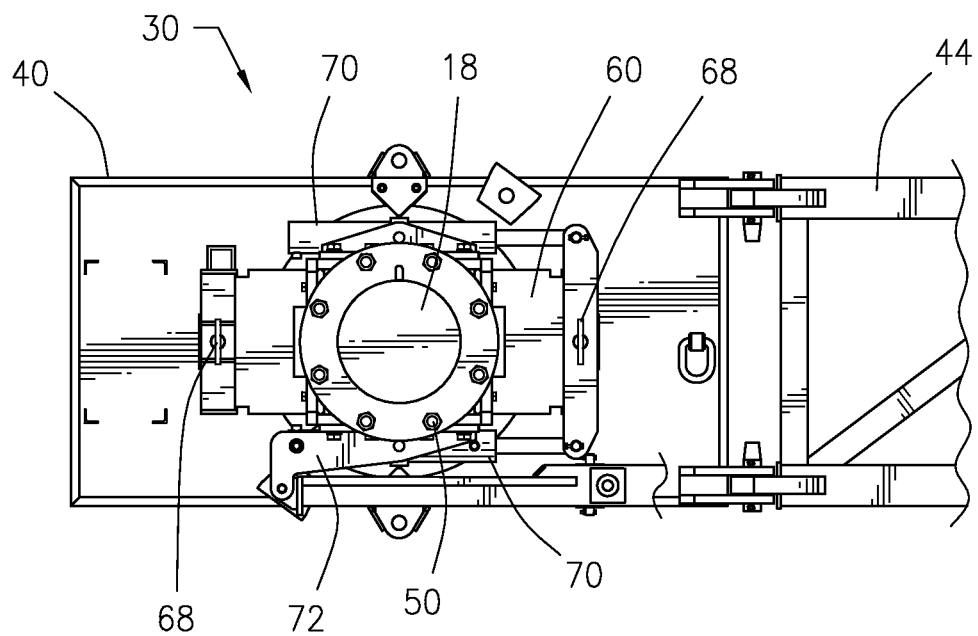
FIG. 6 illustrates a top view thereof.

FIG. 5 illustrates a perspective view of the vertical lifting jack 18, roller assembly 30 and the skid pad 40, while FIG. 6 illustrates a top view thereof.

During skidding operations, a pair of parallel skidding cylinders 70 incrementally moves the roller housing 30 and rollers 58 and, in turn, the vertical lifting jack 18, on the roller track 60. When the lifting jack and roller housing is centered on the roller track, blocks (not shown) may be placed on the track between stops and the roller housing 30 to keep the lifting jack 18 centered on the roller track.

A steering cam arm bracket 72 is fastened to and extends from the roller housing 52.

FIG. 7 illustrates a top view of the first pair of lifting jacks 16 and 18 with the accompanying roller assemblies 28 and 30 and the accompanying skid pads. Portions of the assembly 10 have been cut away for clarity.

A second connecting link 80 joins the steering cam arm bracket 70 from the first second assembly 28 to the steering cam arm bracket 70 from the second roller assembly 30.

FIG. 8 illustrates a sectional view taken along section line 8-8 of FIG. 7 while FIG. 9 illustrates a sectional view taken along section line 9-9 of FIG. 7. The connecting link 80 is removably pinned to each of the steering cam arm brackets 70. The connecting links may be unpinned after steering or positioning is completed.

The connecting link 80 includes an outer tube 82. An actuator 86, such as a hydraulic cylinder (shown in dashed lines), is within the outer tube and is connected at one end to the outer tube 82 as seen in FIG. 8. The actuator 86 is connected at an opposed end to an inner tube 84, as best shown in the sectional view in FIG. 9. The inner tube fits and telescopes within the outer tube. Accordingly, extension or retraction of the actuator 86 extends or retracts the length of the connecting link 80. Extension or retracting of the connecting link 80 will steer or automatically position the pair of roller assemblies 28 and 30. The actuator 86 may be powered by the hydraulic system on the rig or at the rig site.

Figure 10:
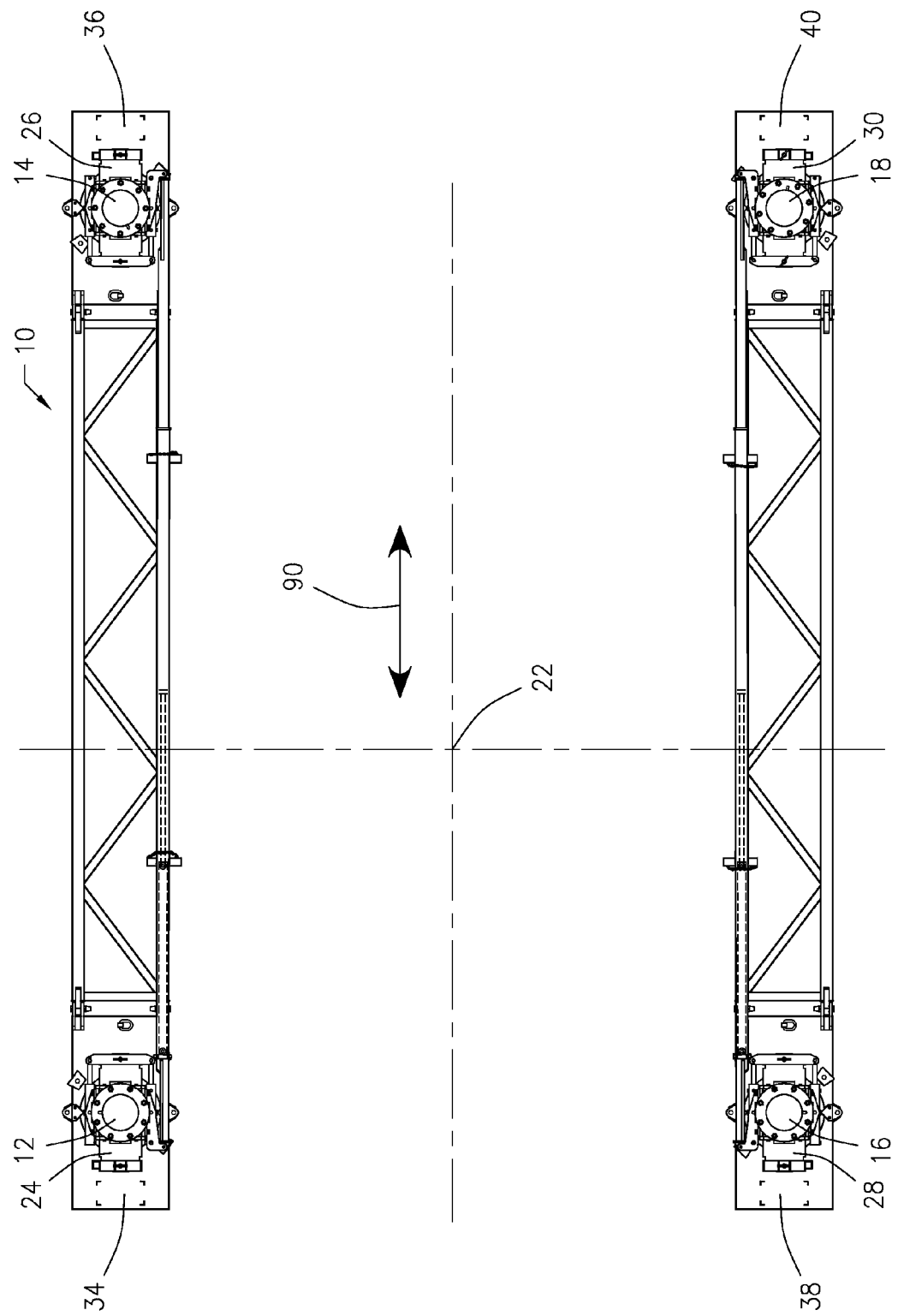
FIGS. 10, 11 and 12 illustrate alternate positioning of the roller assemblies with respect to the skid pads for steering or directional movement.

When the skid pads 40 are raised above ground level as seen in FIGS. 2A and 3A, the assembly may be steered. FIG. 10 illustrates the assembly 10 showing the directional positioning of the roller assemblies 24, 26, 28 and 30 with respect to the skid pads 34, 36, 38 and 40 for steering or directional movement in the directions as shown by arrow 90.

Figure 11:
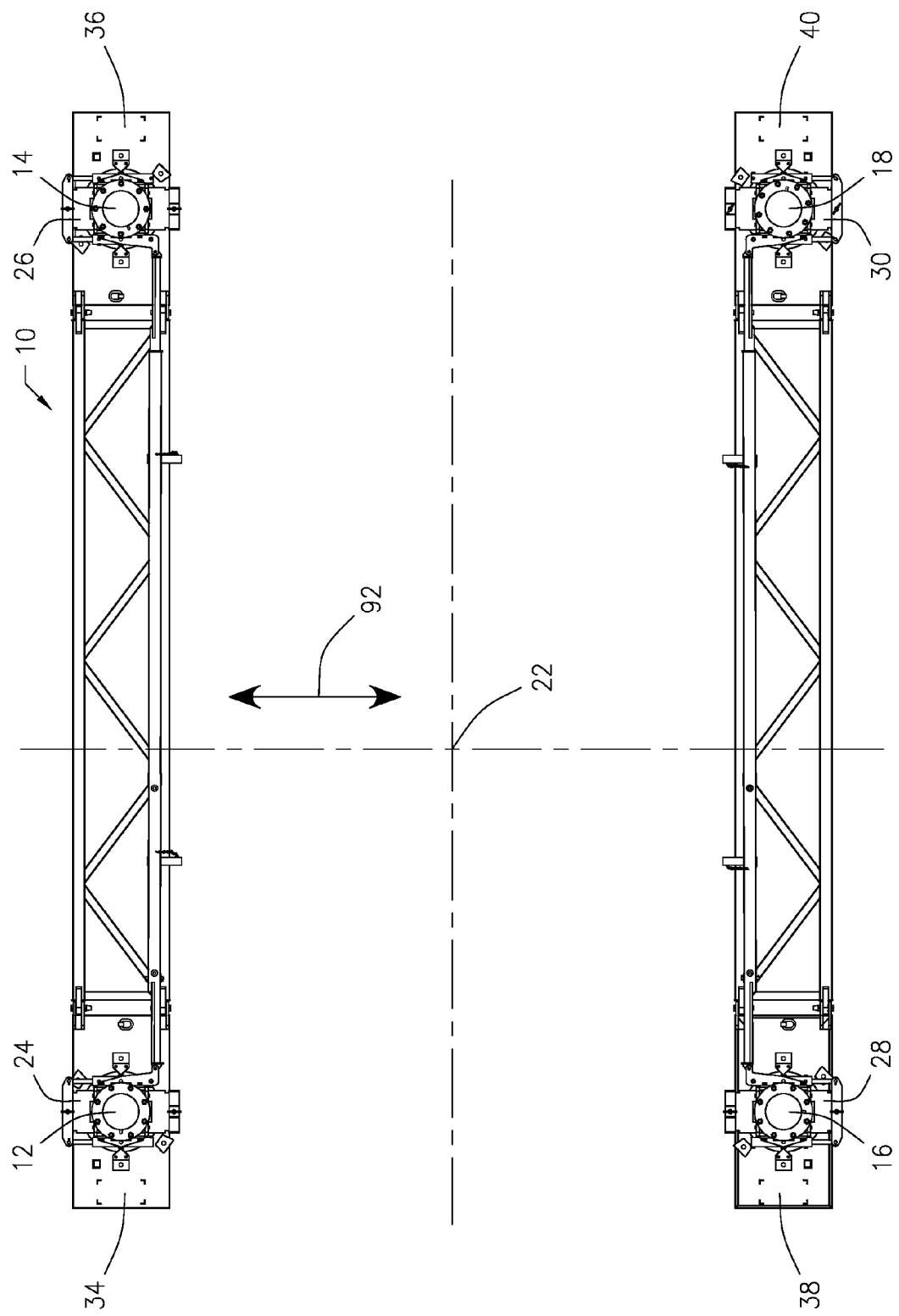

FIG. 11 shows the rig movement and rotational assembly 10 showing the positioning of the roller assemblies with respect to the skid pads for steering or directional movement in the directions shown by arrow 92.

Figure 12:
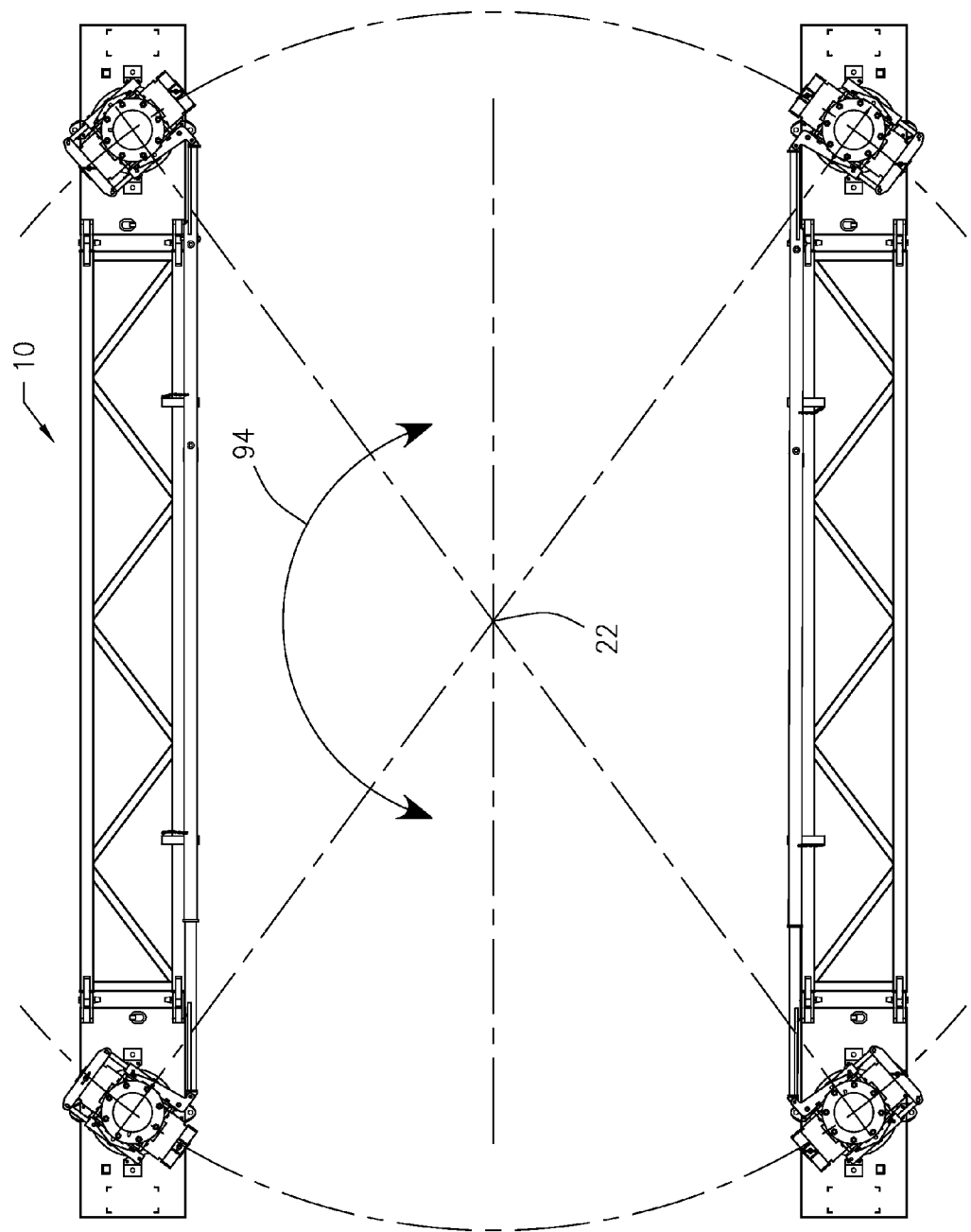

FIG. 12 illustrates the assembly 10 showing the positioning of the roller assemblies with respect to the skid pads for steering or directional movement in the directions shown by arrow 94.

Figure 13:
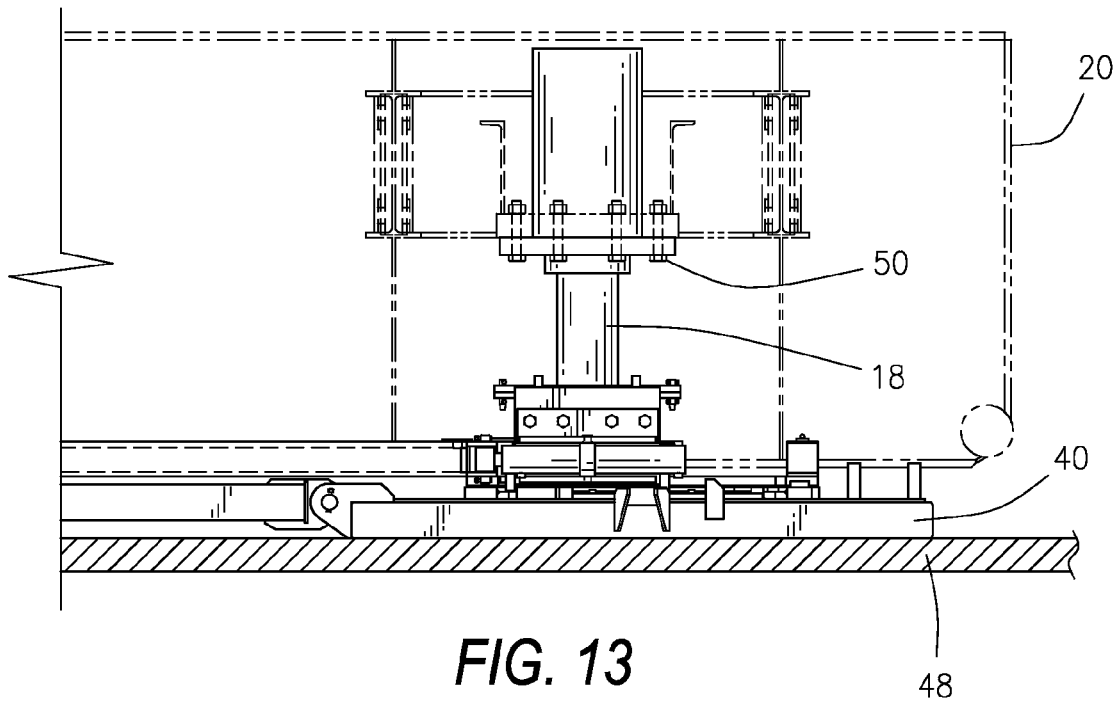
FIGS. 13 and 14 illustrate positioning of the roller assemblies with respect to the skid pads for steering or directional movement as shown in FIG. 10.
Figure 14:
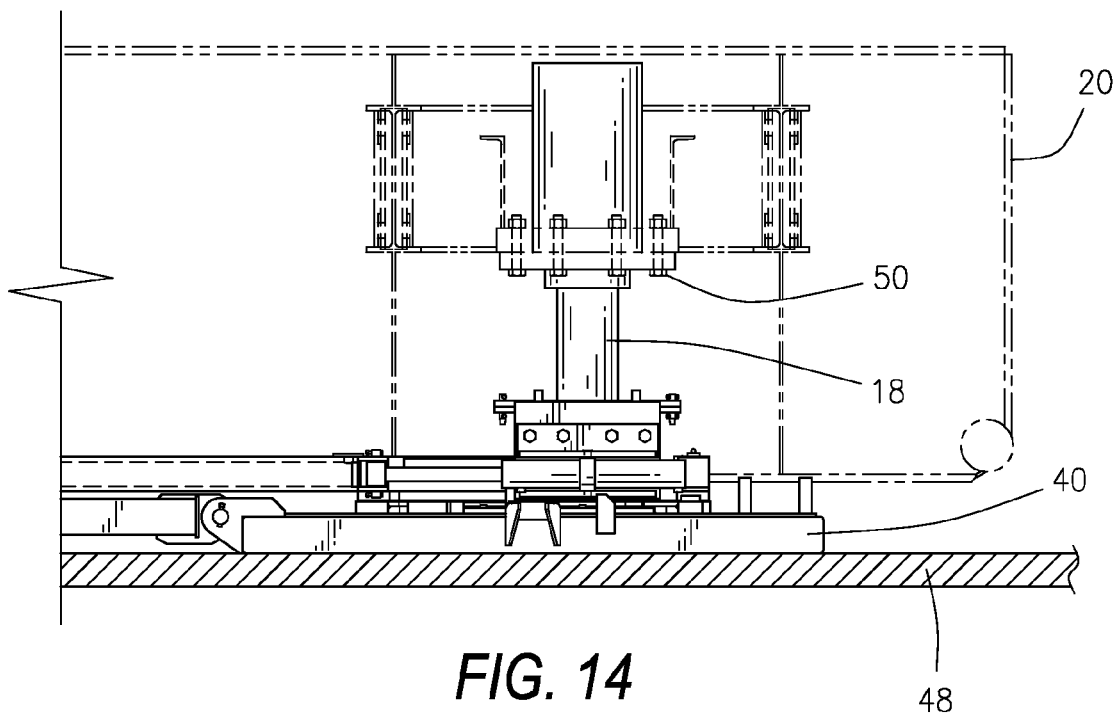

FIGS. 13 and 14 show alternate positions illustrating incremental movement of roller assemblies with respect to the skid pads as shown in FIG. 10.

Figure 15:
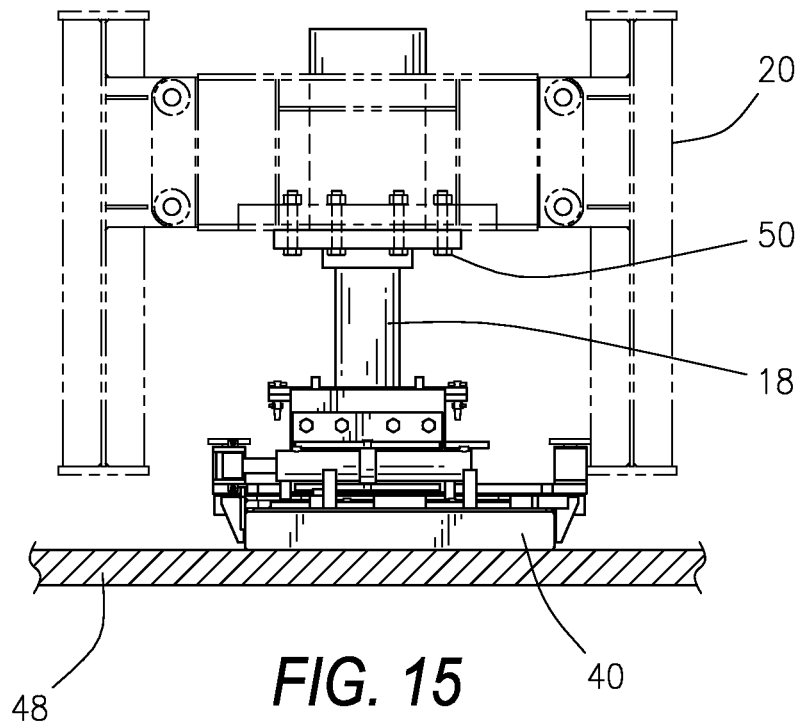
FIGS. 15 and 16 illustrate positioning of the roller assemblies with respect to the skid pads for steering or directional movement as shown in FIG. 11.
Figure 16:
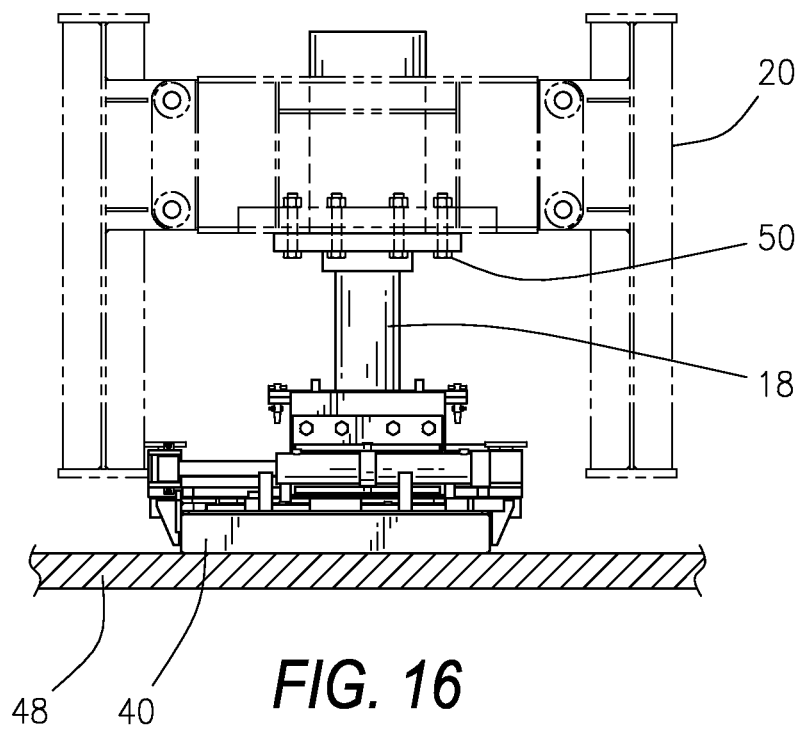

FIGS. 15 and 16 shows alternate positions illustrating incremental movement of the roller assemblies with respect to the skid pads as shown in FIG. 11.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Whereas, the present invention has been described in relation to the drawings attached hereto, it should be understood that other and further modifications, apart from those shown or suggested herein, may be made within the spirit and scope of this invention.

What is claimed is:

1. A rig movement and rotation assembly which comprises:
   a first pair of vertical lifting jacks, comprising a first vertical lifting jack and a second vertical lifting jack;
   a second pair of vertical lifting jacks, comprising a third vertical lifting jack and a fourth vertical lifting jack;
   each of said vertical lifting jacks having an upper end connected to a rig substructure and a lower end;
   a first roller assembly connected to said lower end of each of said first pair vertical lifting jacks, and a second roller assembly connected to said lower end of each of said second pair of vertical lifting jacks, each said roller assembly rotatable on an axis;
   a steering cam arm bracket extending from each said roller assembly;
   a first connecting link comprising an outer tube and an inner tube, the inner tube fits and telescopes within the outer tube, wherein said first connecting link joining said steering cam arm brackets from said first roller assemblies of said first pair of vertical lifting jacks together;
   a second connecting link comprising an outer tube and an inner tube, the inner tube fits and telescopes within the outer tube, wherein said second connecting link joining said steering cam arm brackets from said second roller assemblies of said second pair of vertical lifting jacks together;
   a first actuator within the outer tube extends or retracts a length of said first connecting link, where the first actuator is located between the first vertical lifting jack and the second vertical lifting jack;
   a second actuator within the outer tube extends or retracts a length of said second connecting link, where the second actuator is located between the third vertical lifting jack and fourth vertical lifting jack; and
   a skid pad for each of said vertical lifting jacks, each said skid pad engaging said roller assembly via a plurality of openings in an annular pattern on each said roller assembly and a plurality of openings in an annular pattern on each said skid pad, wherein locking pins are received through said roller assembly openings and in said skid pad openings to lock each said roller assembly to each said skid pad in any of a plurality of orientations.

2. The rig movement and rotation assembly as set forth in claim 1 wherein each said roller assembly includes a roller housing, a plurality of rollers therein, a pair of skidding cylinders, and a roller track.

3. The rig movement and rotation assembly as set forth in claim 1 wherein each said skid pad includes a plurality of guides arranged in an annular pattern with the plurality of openings on each said skid pad arranged in the guides.

4. The rig movement and rotation assembly as set forth in claim 1 wherein said first connecting link and said first actuator and said second connecting link and said second actuator are detachable from said steering cam arm brackets.

5. The rig movement and rotation assembly as set forth in claim 1 including a first pad spreader assembly extending between said first pair of vertical lifting jacks and a second pad spreader assembly extending between said second pair of vertical lifting jacks.

6. The rig movement and rotation assembly as set forth in claim 1 wherein extension or retraction of the first actuator causes the first roller assemblies to rotate in opposing directions and extension or retraction of the second actuator causes the second roller assemblies to rotate in opposing directions.

* * * * *